(12) United States Patent
Rothbauer

(10) Patent No.: US 7,510,070 B2
(45) Date of Patent: Mar. 31, 2009

(54) RECIPROCATING FORWARD-FEED DEVICE FOR THE CLOCKED LINEAR FORWARD-FEED OF STACKS OF GOODS OVER A TRANSPORT PATH

(75) Inventor: Andreas Rothbauer, Rosengarten (DE)

(73) Assignee: OPTIMA filling and packaging machines GmbH, Schwäbisch Hall (DE)

( * ) Notice: Subject to any disclaimer, the term of this patent is extended or adjusted under 35 U.S.C. 154(b) by 0 days.

(21) Appl. No.: 11/859,492

(22) Filed: Sep. 21, 2007

(65) Prior Publication Data
US 2008/0075573 A1 Mar. 27, 2008

(30) Foreign Application Priority Data
Sep. 21, 2006 (DE) .................. 10 2006 045 107

(51) Int. Cl.
B65G 19/00 (2006.01)
B65G 47/82 (2006.01)

(52) U.S. Cl. .............. 198/717; 198/474.1; 198/578; 198/737

(58) Field of Classification Search .......... 198/474.1, 198/478.1, 578, 717, 726, 737; 414/749.1, 414/749.5, 782
See application file for complete search history.

(56) References Cited

U.S. PATENT DOCUMENTS

| | | | | |
|---|---|---|---|---|
| 1,766,142 A | * | 6/1930 | Olson | 198/463.2 |
| 5,133,446 A | * | 7/1992 | Draghetti | 198/418.5 |
| 5,529,167 A | * | 6/1996 | Gabriele | 198/457.01 |
| 6,170,635 B1 | * | 1/2001 | Rommelli | 198/429 |
| 6,715,981 B1 | * | 4/2004 | Harsch et al. | 414/752.1 |
| 6,752,584 B2 | * | 6/2004 | Woodruff et al. | 414/744.5 |
| 6,910,847 B1 | * | 6/2005 | Blaufus et al. | 414/744.5 |
| 7,044,707 B2 | * | 5/2006 | Garin et al. | 414/749.1 |
| 7,255,221 B2 | * | 8/2007 | Ormerod et al. | 198/474.1 |
| 7,275,633 B2 | * | 10/2007 | Zimmermann | 198/474.1 |
| 7,331,441 B2 | * | 2/2008 | Persson | 198/370.08 |
| 7,377,375 B2 | * | 5/2008 | Feigel et al. | 198/377.06 |

FOREIGN PATENT DOCUMENTS

| | | |
|---|---|---|
| EP | 0 711 718 A1 | 5/1996 |
| EP | 0 943 562 A1 | 9/1999 |
| EP | 1 162 146 A2 | 12/2001 |

OTHER PUBLICATIONS

European Search Report mailed Jan. 30, 2008.

* cited by examiner

*Primary Examiner*—Douglas A Hess
(74) *Attorney, Agent, or Firm*—Browdy and Neimark, P.L.L.C.

(57) ABSTRACT

A reciprocating forward-feed device for the clocked linear forward-feed of stacks of goods over a transport path has a double-arm rotatable forward-feed lever with two pushers which operate in a clocked manner. Forward-feed lever and pusher are driven in a controlled manner by means of a four-arbor arrangement with a linear arbor, rotational arbor and pivot arbor for the pushers linked via guide rods and a return swivel arbor.

11 Claims, 6 Drawing Sheets

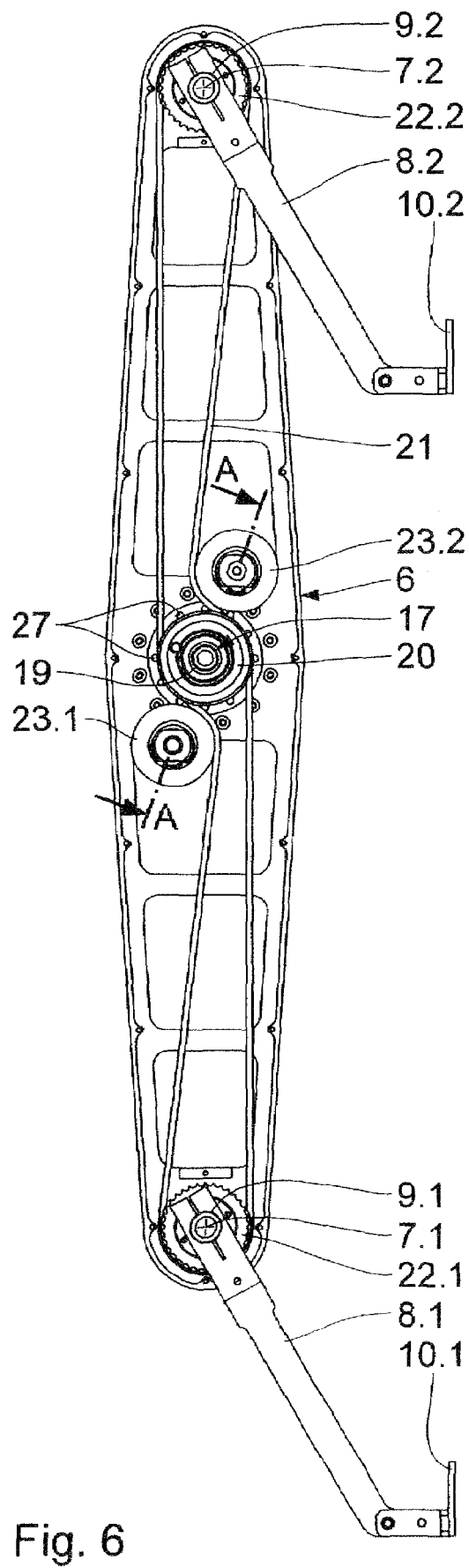
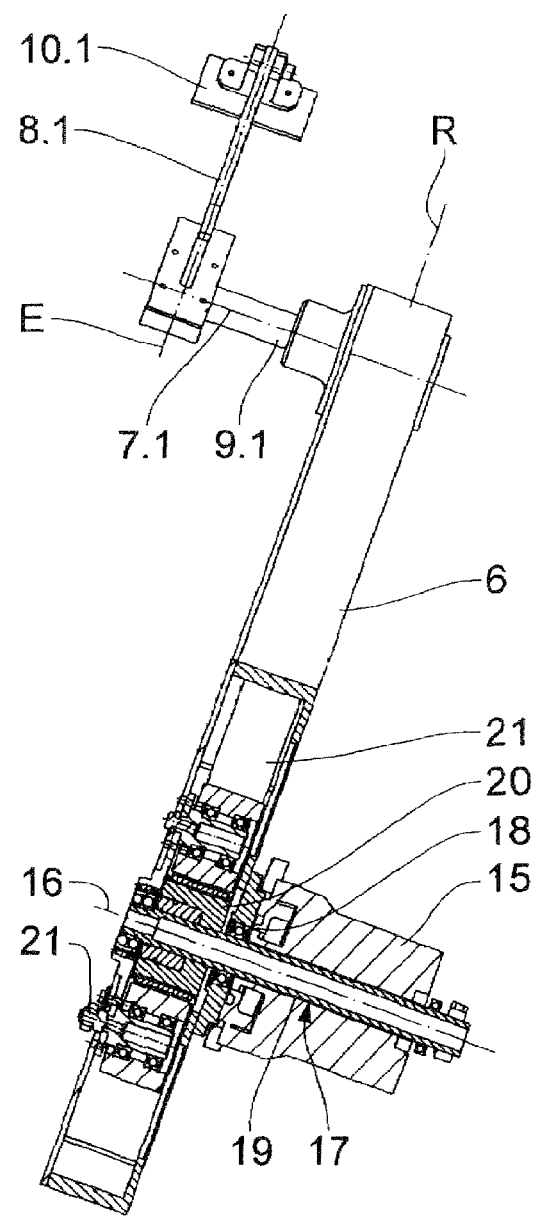
Fig. 6
Fig. 7

RECIPROCATING FORWARD-FEED DEVICE FOR THE CLOCKED LINEAR FORWARD-FEED OF STACKS OF GOODS OVER A TRANSPORT PATH

BACKGROUND OF THE INVENTION

1. Field of the Invention

The invention relates to a reciprocating forward-feed device for the clocked linear forward-feed of stacks of goods over a transport path.

2. Background Art

Regarding the background of the invention, it is found that there are problems in the handling of stacks of goods in a broad range of industrial fields. One example to be cited is packaging technology in which, for example, products have to be continuously brought in from a production line, grouped into stacks of a number of products corresponding to a size of packaging and then brought to a packing line. The problems with the clocked linear forward-feed of stacks of goods over a transport path occur here regularly.

The product's characteristics can render the handling of stacks of goods considerably more difficult. Stack format and height, product format, surface characteristics and the product's inherent stability are influencing factors which determine the handling characteristics of stacks of goods as these factors interact with one another.

One example which may be mentioned is a packing line in the hygiene industry in which, for example, panty liners or sanitary towels are grouped into stacks and within the packing line require pushing in the form of loose stacks of goods linearly several times over transport paths from packing station to packing station. It is obvious that owing to their softness and relatively irregularly formed surfaces such hygiene products only form an extremely unstable stack. Nonetheless such a forward-feed arrangement has to ensure rapid forward-feeding and careful handling of the stack.

SUMMARY OF THE INVENTION

On this basis, the object of the invention is to provide a reciprocating forward-feed device for the clocked linear forward-feed of stacks of goods over a transport path, which allows a high clock rate and careful handling of the stack. This object is achieved by a forward-feed comprising a double-arm forward-feed lever rotatable in a rotational plane parallel to the transport path and on the two ends of which pushers are mounted and pivotally driven via guide rods in a plane parallel to the rotational plane of the forward-feed lever, the pushers being engageable alternately with a stack of goods, a four-arbor arrangement for mounting and for the controlled, superimposed rotational, linear and pivoting drive of the forward-feed lever and its guide rods with a rotational arbor, driven rotationally at a constant angular velocity, horizontally and transversely to the transport path and arranged outside thereof, a linear arbor driven linearly in a reciprocating manner and coupled to the rotational arbor, said linear arbor being inclined in a plane parallel to the rotational plane at an angle to the end of the transport path, a pivot arbor for the pivoting drive of the guide rods relative to the forward-feed lever, and a return swivel arbor integrated therein for the guide rods of the pushers, as well as a control of the movement of the forward-feed lever and its guide rods by means of the four-arbor arrangement, in such a way that starting from a transfer position, one of the two pushers, during a transport stroke with superimposition of a rotational movement of the rotational arbor, a linear movement of the linear arbor towards the transport path and a pivoting movement of the associated guide rod of the pushers pushes the stack of goods linearly from the transfer position along the transport path into the delivery position of the stack of goods at the end of the transport path, where, through activation of the return swivel arbor, during further pivoting of the forward-feed lever, this pusher is lifted by means of a limited, reciprocating return swivelling movement of the guide rod backwards from the stack of goods and is led behind this away from the transport path, and subsequently the pusher is returned in a return stroke with superimposition of a further rotational movement of the rotational arbor, a return linear movement of the linear arbor away from the transport path and a further pivoting movement of the guide rod on the side of the rotational arbor facing away from the transport path and is swivelled from behind onto the transport path back into the transfer position for the next-but-one respective stack of goods, and the other pusher executes the aforementioned cycle with a phase shift of 180° from the one pusher while the next respective stack of goods is being transported.

Owing to the above design of the forward-feed arrangement according to the invention, a high clock rate can be achieved due to the two pushers present which can be brought into engagement alternately with a stack of goods. The use of two pushers is possible owing to the decoupling of the transport stroke and return stroke paths.

The drive elements for the forward-feed lever and its guide rods are constructed as a four-arbor arrangement, the term "arbor" being used as a driven degree of freedom of a machine component in the sense of robot technology.

The rotational arbor which is involved in this arrangement is moved at a constant angular velocity in a manner which is simple in terms of drive technology, so a smooth circulation of the forward-feed lever is achieved, the cycle being easily controlled in respect of the moments of inertia. Only the reciprocating movement is superimposed on this owing to the linear arbor.

Through the linear arbor which is inclined towards the transport path, the increasing distancing of the pusher from the transport path elicited during the superimposed rotational movement of the forward-feed lever is balanced out again by a synchronous approach to the transport path. To this extent, the linear forward-feed path can be achieved along the transport path.

The integrated return swivel arbor for the guide rods of the pushers results in the pusher at the end of the transport path, not simply pulling away in a lateral direction from the transport path. This would result in the handling of very light products with not very smooth or soft surfaces being exposed to the risk of the products being dragged along and the stack thus being destroyed. This avoids the limited, reciprocating return swivelling movement of the guide rods owing to the integrated return swivel arbor.

The coupling and superimposition of rotational and linear arbors can be constructed in such a way that the linear arbor is mounted rotationally on a stationary rotational arbor. The relatively large masses to be moved on both the rotational and linear arbors present a particular problem of this variant.

For the aforementioned reasons a linear arbor with a linear guide arranged stationarily with respect to the transport path with a linear carriage mounted displaceably thereon represents a preferred embodiment.

According to further preferred embodiments the linear arbor is formed by a linear motor and the rotational arbor is arranged displaceably thereon. Preferably the rotational arbor with its rotational drive is seated on the aforementioned linear carriage.

The pivot arbor of the guide rods around the ends of the forward-feed lever also provided according to the invention ensure that—except for the short return swivelling movement at the end of the transport path—the guide rods are always spatially located in an unvarying orientation relative to the transport path. Basically an individual motor can be integrated into the forward-feed lever for the pivot arbors of the guide rods, although this would result in increased complexity in terms of mechanical engineering.

To this extent in a preferred embodiment it is envisaged that the drive of the pivot arbors of the guide rods is derived from the rotational arbor in order to avoid this problem. For this, the pivot arbors of the guide rods can be jointly coupled via a revolving chain or synchronous belt drive to a coaxial central pinion which is stationary relative to the rotational arbor during the transport and return stroke. More information on this is provided in the description of the embodiment.

The return swivelling movement of the guide rods could also be elicited by corresponding control of the above-mentioned independent pivoting drives of the guide rods. In the case of a pivoting drive of the pivot arbors of the guide rods derived from the rotational arbor, the central pinion, which is stationary per se, is in turn to be brought into action to generate the return swivelling movement in turn, said central pinion in a preferred embodiment being swivel-mounted and capable of being driven in a reciprocating manner. The central pinion therefore has multiple functions, since both the pivoting drive of the guide rods and their return swivelling movement can be generated by means thereof.

Various drive alternatives are in turn conceivable for this return swivelling movement, such as for example a cam drive, a separate servomotor or a pneumatic drive.

Other features, details and advantages of the invention emerge from the following description in which an embodiment is described in more detail using the accompanying drawings.

BRIEF DESCRIPTION OF THE DRAWINGS

FIG. 6 shows a front view of the rotatable forward-feed lever with machine components arranged within its interior, FIG. 7 shows a section through the forward-feed lever with rotational drive along the section A-A according to FIG. 6.

DESCRIPTION OF THE PREFERRED EMBODIMENT

Figure 1:
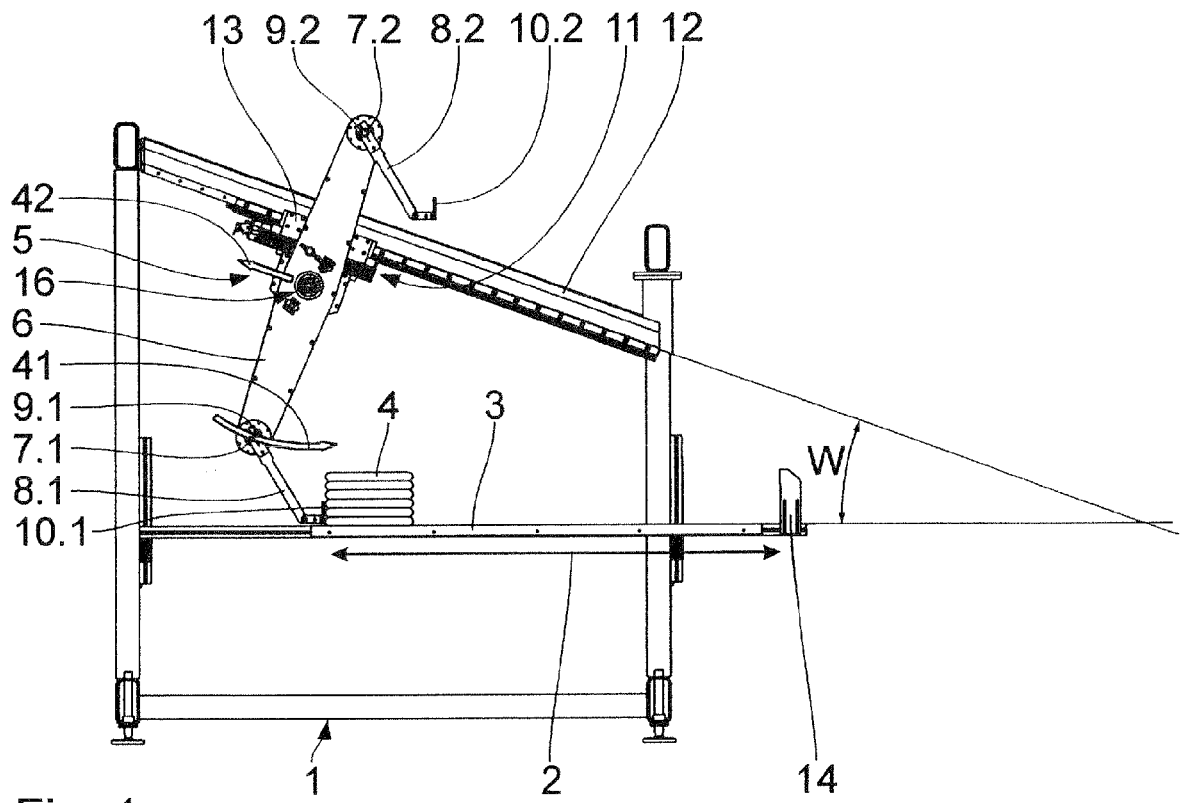
FIGS. 1 to 5 show front views of the forward-feed device with the transport path in sequential positions.

The basic construction of the reciprocating forward-feed device is revealed in FIGS. 1 to 5. A transport path 2 in the form of a horizontal slide path 3 is provided on a machine frame 1, being limited by vertical lateral walls—which are not shown on the drawing owing to the need for clarity. The forward-feed device is part of a packing line within which a stack of goods 4 comprising, for example, sanitary towels is to be forward fed linearly in a clocked manner over the transport path 2.

The actual forward-feed device 5 has as its central portion a double-arm forward-feed lever 6 which can be rotated in a rotational plane R (see FIG. 7) parallel to the transport path 2, guide rods 8.1, 8.2 being mounted and driven pivotally in pivot arbors 7.1, 7.2 at each end of said forward-feed lever 6. For this the guide rods 8.1, 8.2 are mounted in a pivot plane E parallel to the rotational plane R on shafts 9.1, 9.2. Pushers 10.1, 10.2 which can be brought into engagement alternately with a stack of goods 4 are mounted at each free end of the guide rods 8.1, 8.2.

The forward-feed lever 6 is mounted with a four-arbor arrangement and provided with a controlled, superimposed rotational, linear and pivoting drive. On the machine frame 1 there is therefore firstly a linear arbor generally designated as 11 which is in the form of a linear motor formed by a stationary linear guide 12 and a displaceably driven linear carriage 13 mounted thereon. The linear guide 12 here is inclined in a plane parallel to the rotational plane R at an angle W to the end 14 of the transport path 2 marking the delivery position of the stack of goods 4.

Secondly, an electric motor 15 is mounted on the linear carriage 13 as a rotational arbor 16 for the constant pivoting drive of the forward-feed lever 6. The output shaft of the electric motor 15 is connected in a manner which is not shown in greater detail to the forward-feed lever 6 mounted rotatably on the rotational arbor 16 and drives said forward-feed lever 6 at a constant angular velocity.

The pivoting drive of the pivot arbors 7.1, 7.2 for the guide rods 8.1, 8.2 is described with reference to FIG. 6 and 7, said pivoting drive being derived from the rotational arbor 16. Referring to FIG. 7, the forward-feed lever 6 on the one hand is coupled centrally to the output shaft 18 of the electric motor 15 mounted on the linear carriage 13 in a manner not shown in detail. A shaft 19 coaxially seated in the output shaft 18 and onto which a central pinion 20 is placed within the forward-feed lever 6 is also provided. The shaft 19 with the central pinion 20 is swivel-mounted in the electric motor 15; however—apart from the return swivelling movement yet to be described in detail—it is kept stationary.

Referring to FIG. 6, the central pinion 20 engages with a synchronous belt 21, which is led over a respective gear-wheel 22.1, 22.2 on the pivot arbor 7.1, 7.2 of the guide rods 8.1, 8.2. These gear-wheels 22.1, 22.2 carry the shafts 9.1, 9.2 of the guide rods 8.1, 8.2 and have the same number of teeth as the central pinion 20. The engagement of the synchronous belt 21 with the central pinion 20 is assisted and ensured by two diametrically opposed, flanking guide rolls 23.1, 23.2. Owing to the aforementioned construction, on rotation of the forward-feed lever 6 by means of the electric motor 15 owing to the associated roll-off movement of the synchronous belt 21 on the stationary central pinion 22 the synchronous belt 21 is caused to revolve and this in turn pivots the gear-wheels 22.1, 22.2 relative to the forward-feed lever 6 in such a way that the guide rods 8.1, 8.2 always remain at a constant orientation at a specific angle to the transport path 2 irrespective of the rotational position of the forward-feed lever 6, but as already mentioned with the exception of the return swivelling movement which is to be described hereinafter. The sequence shown in FIGS. 1 to 5 illustrates this.

Figure 10:
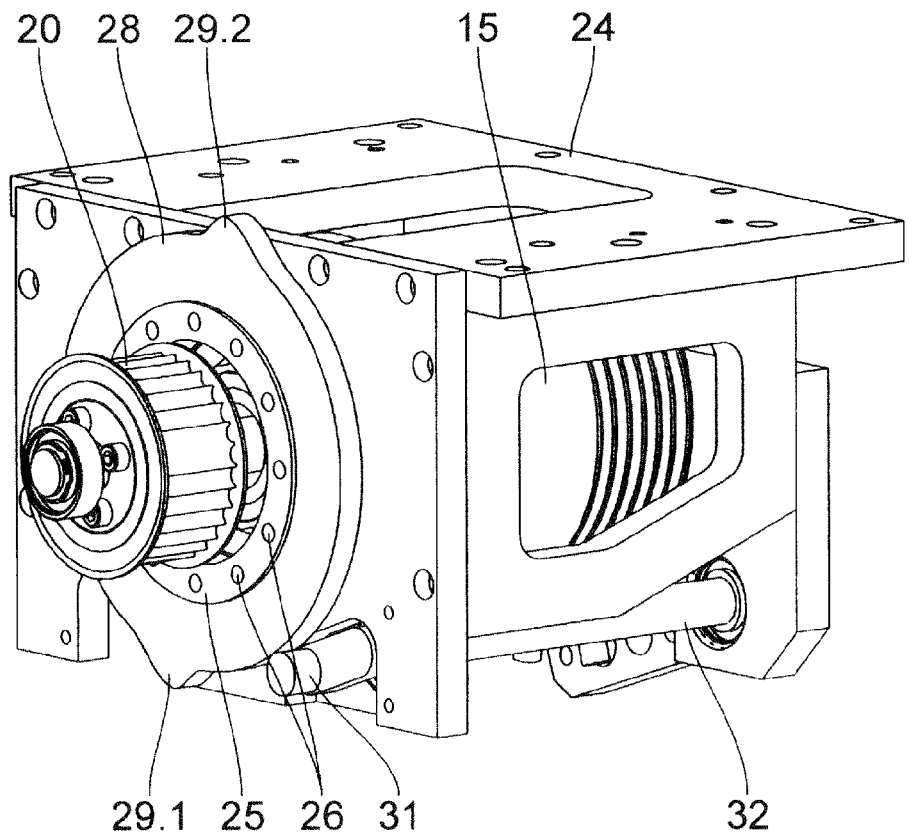
FIG. 10 shows a perspective representation of the component according to FIG. 8.
Figure 8:
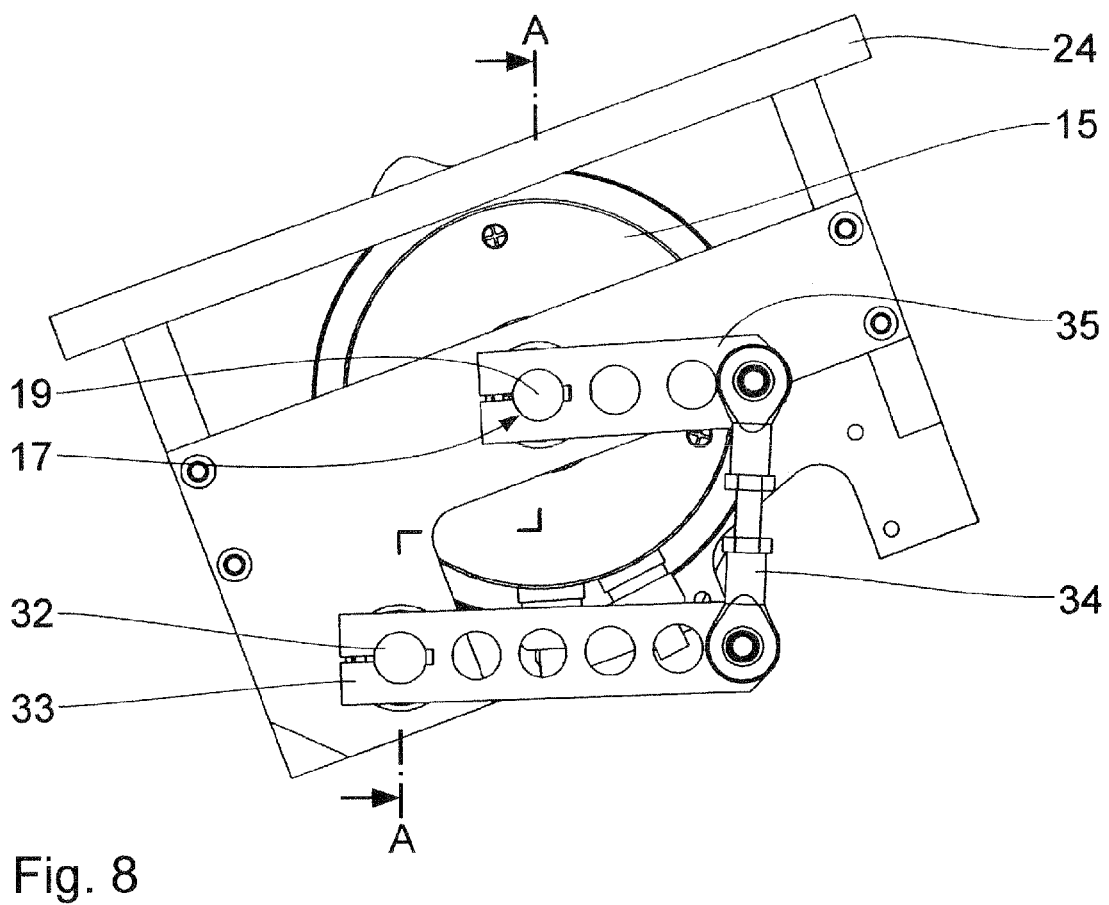
FIG. 8 shows a rear view of the rotational drive of the forward-feed lever with a return swivel device for its guide rods in the form of a cam control.
Figure 9:
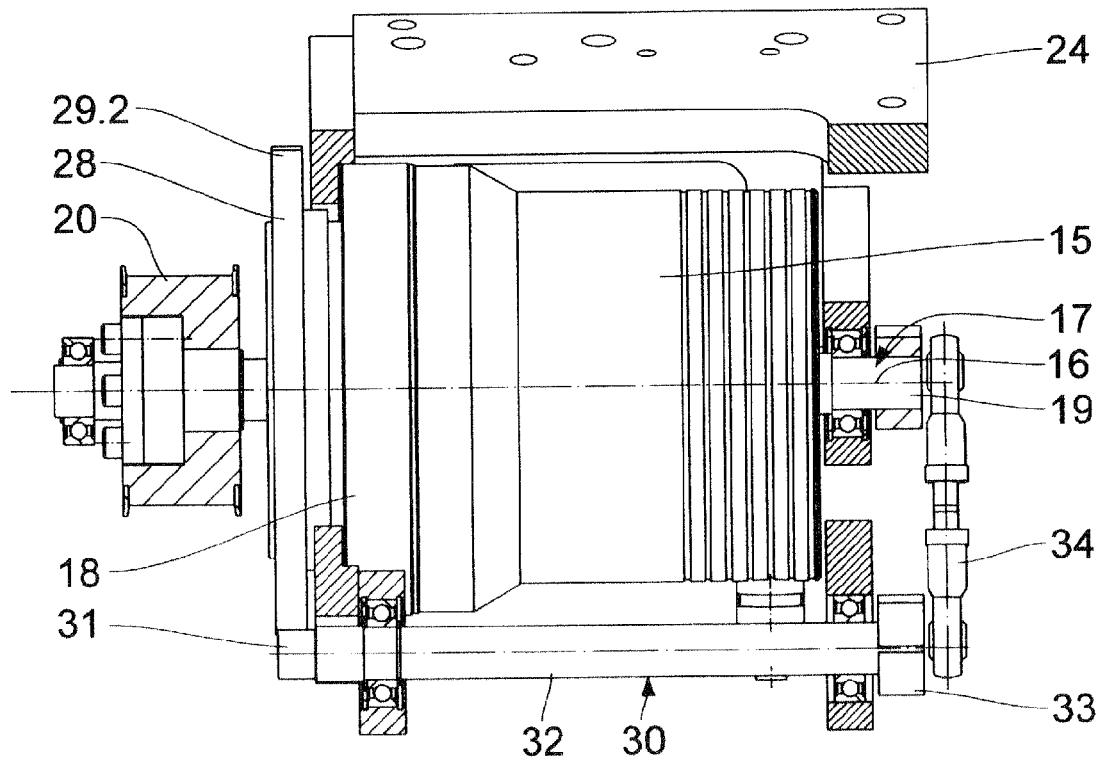
FIG. 9 shows a section along the section A-A according to FIG. 8.

FIGS. 8 to 10 illustrate a first variant for the return swivelling movement of the guide rods 8.1, 8.2 defining the return swivel arbor 17 as mentioned several times. Thus in FIG. 8 the stationary portion of the rotational arbor 16 is shown with a bearing construction 24, electric motor 15 and central pinion 20. The pivotable forward-feed lever 6 is omitted for the sake of clarity; however, FIG. 8 shows an annular flange 25 of which the indicated fastening holes 26 receive the fastening screws 27 for the forward-feed lever as shown in FIG. 6. A cam disc 28 having two diametrically opposed control cams 29.1, 29.2 is connected non-rotatably to the annular flange 25. This cam drive is coupled to a knee lever construction 30 which has a stop 31 deflectable by the control cams 29 and transmission levers 32, 33 and 34 connected thereto. These act on a knee lever 35 coupled to the shaft 19 so that, through a deflection of the stop 31 by means of one of the control cams 29, the shaft 19 of the central pinion 20 is deflected in a reciprocating manner through a short swivel angle. With this swivel arbor 17 the uniform pivoting drive of the guide rods 8.1, 8.2 is briefly interrupted by the reciprocating movement of the central pinion 20 and is converted into a short return swivelling movement of the guide rods 8 as described in more detail below.

Figure 11:
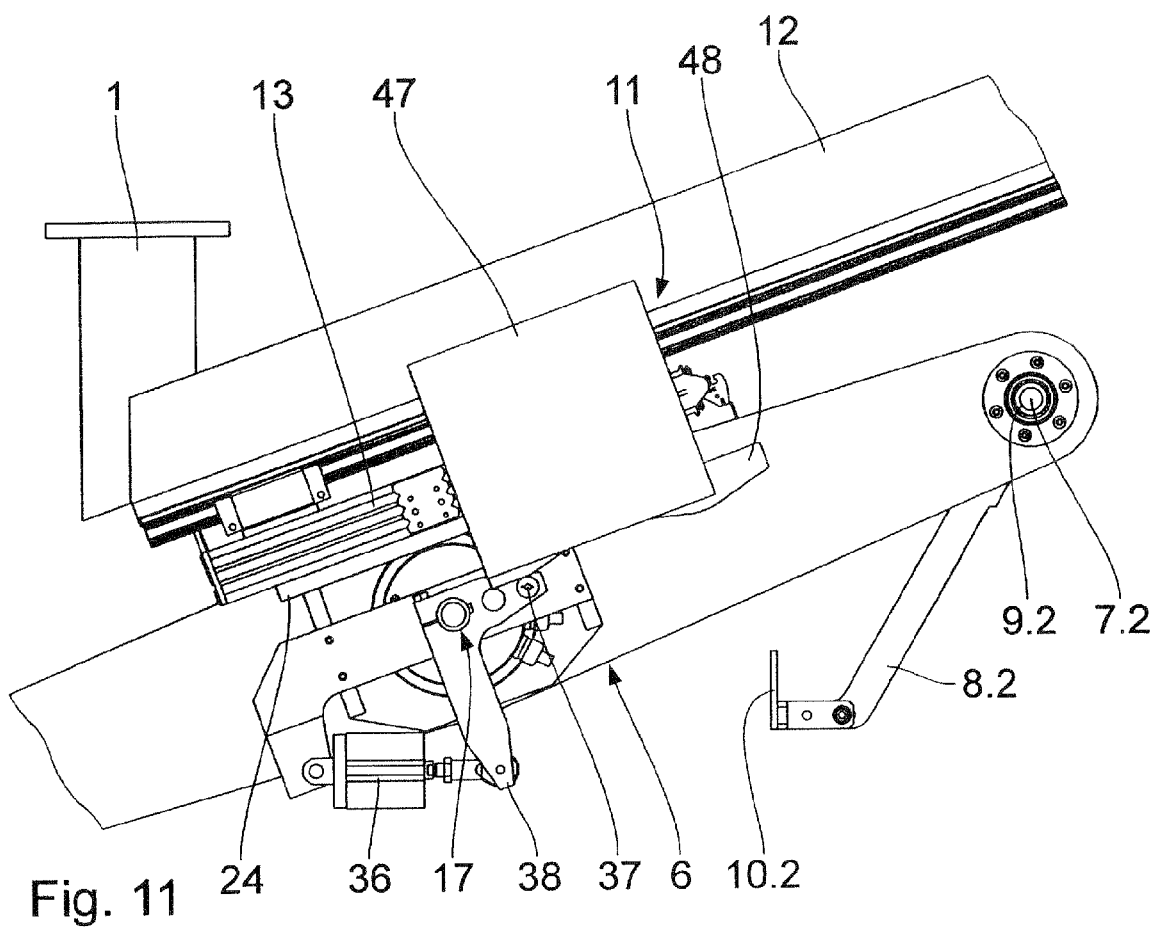
FIG. 11 shows a rear view of the linear drive with a rotationally driven forward-feed lever with a return swivelling device in the form of a pneumatic drive.

FIG. 11 shows a cam control for the return swivelling movement, derived from the linear arbor 11, of the guide rods 8.1, 8.2 via the central pinion 20. For this, a holder 47 for a cam link 48 which cooperates with a feeler roller 37 on one leg of an L-shaped swivel lever 38 is arranged on the linear guide 12 at its lower end. The swivel lever 38 is rigidly coupled to the shaft 19 for the central pinion 20 and is loaded anti-clockwise by a pneumatic spring 36 acting on the other arm of the swivel lever 38. As soon as the linear carriage 13 at the end of its movement along the linear guide 12 moves along the cam link 48, it deflects the swivel lever 38 via the feeler roller 37 and pivots the central pinion 20 in a reciprocating manner through a small angle owing to the undulating cam link 48.

The loading force of the pneumatic spring 36 can simultaneously be used as a monitoring device for any impact of the pushers 10.1, 10.2 on an obstacle. By means of such inhibition of the pushers 10.1, 10.2 a pivoting moment is generated at the central pinion 20 via the synchronous belt 21 and leads to a deflection of the swivel lever 38 against the load of the pneumatic spring 36. This deflection is detected by means of a touch contact not shown in detail and the forward-feed is then interrupted correspondingly. On reaching the cam link 48, the signal of the touch contact is suppressed by the machine controls because the deflection of the swivel lever 38 is intentional this time.

Figure 12:
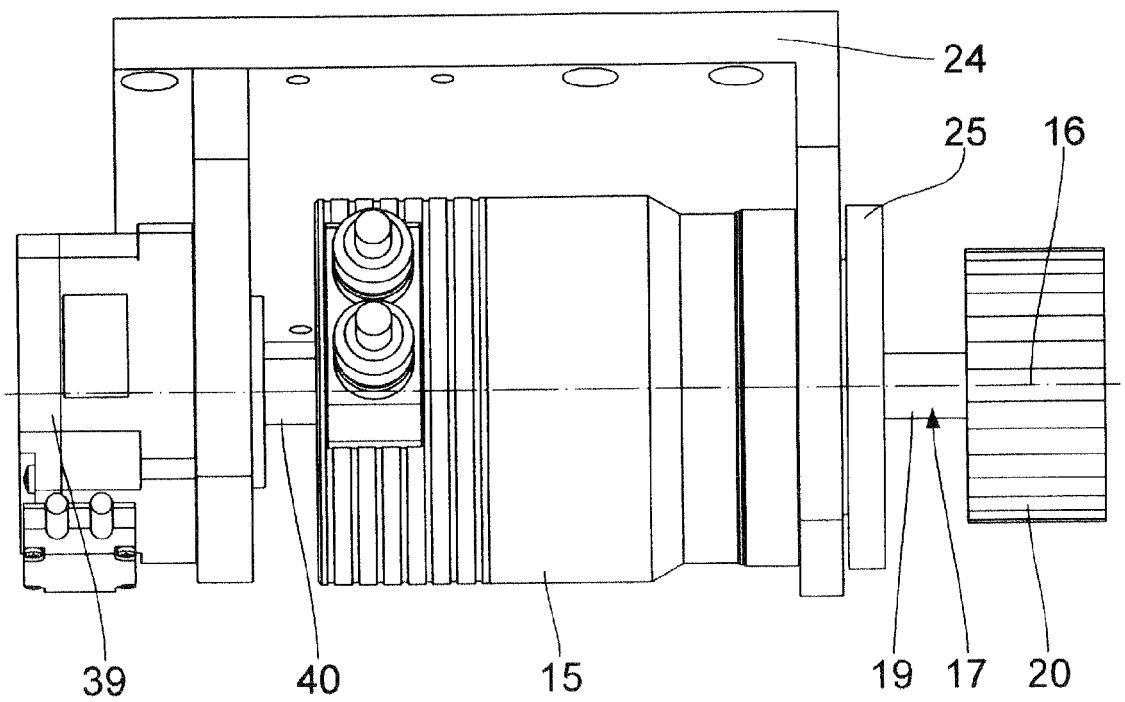
FIG. 12 shows an end face view of the central portion of the forward-feed lever with a rotational drive and a return swivelling device in the form of a servomotor.

FIG. 12 shows a further alternative for the swivel arbor 17 of the central pinion 20, namely a servomotor 39 flanged onto the bearing construction 24, of which the output shaft 40 is coupled to the shaft 19. By means of the servomotor 39 the shaft 19, and therefore the central pinion 20, can thus to a limited extent be briefly swivelled in a reciprocating manner by this means at the correct instant.

As a further alternative for the control of the central pinion, a pneumatic cylinder arranged on the bearing construction 24 (not shown) can also be provided, of which the piston rod in turn is coupled to the shaft 19 of the central pinion via a knee lever. Through a short reciprocating stroke of the piston rod the shaft 19 is briefly swivelled via the knee lever and in turn the return swivelling of the guide rods 8 or pushers 10 is generated as already mentioned several times above.

The control of the movement of the forward-feed lever 6 and of its guide rods 8 with the pushers 10 by means of the four-arbor drive consisting of the linear arbor 11, the rotational arbor 16, the pivot arbors 7.1, 7.2 and the swivel arbor 17 of the guide rods 8 is described below in more detail with reference to FIGS. 1 to 5.

In FIG. 1, the forward-feed arrangement 5 is shown in its transfer position, in which the one 10.1 of the pushers 10.1, 10.2 is moved from behind to the stack of goods 4 and touches the stack of goods 4. The reverse linear movement (arrow 42) of the linear arbor 11 is thereby superimposed on the rotational movement (arrow 41) of the forward-feed lever 6, so that the pusher 10.1 is brought from behind into this transfer position at the stack of goods 4 in the direction of the transport path 2 with a very low velocity component.

Figure 2:
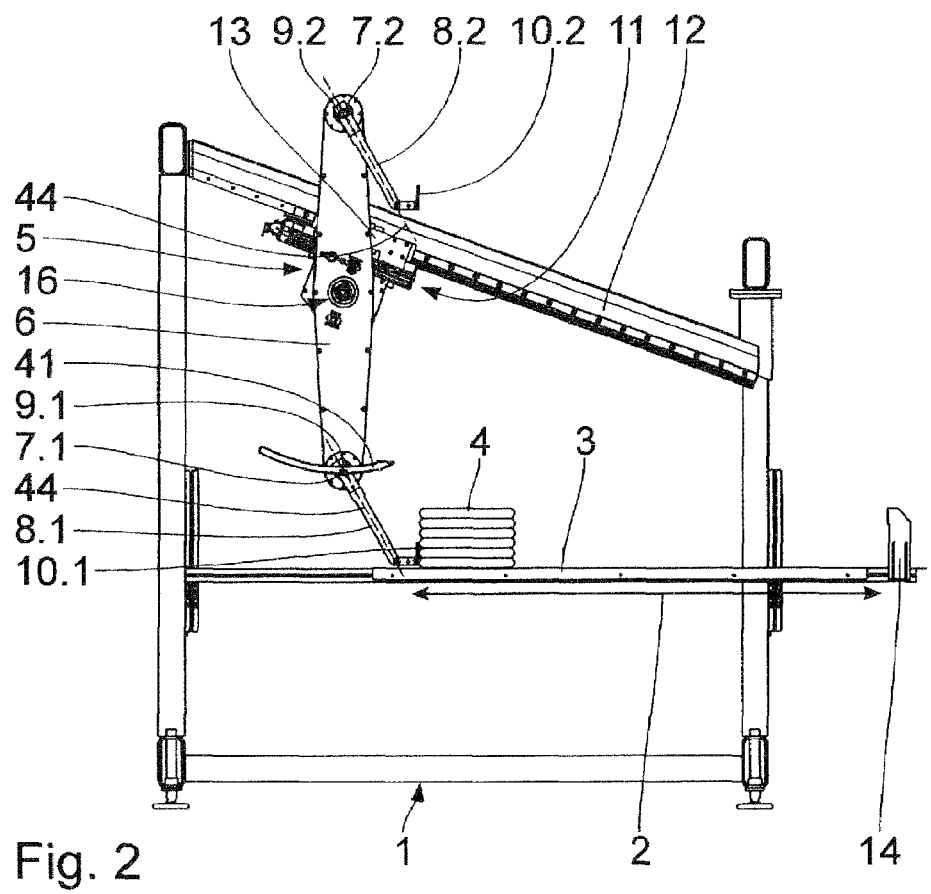
Figure 3:
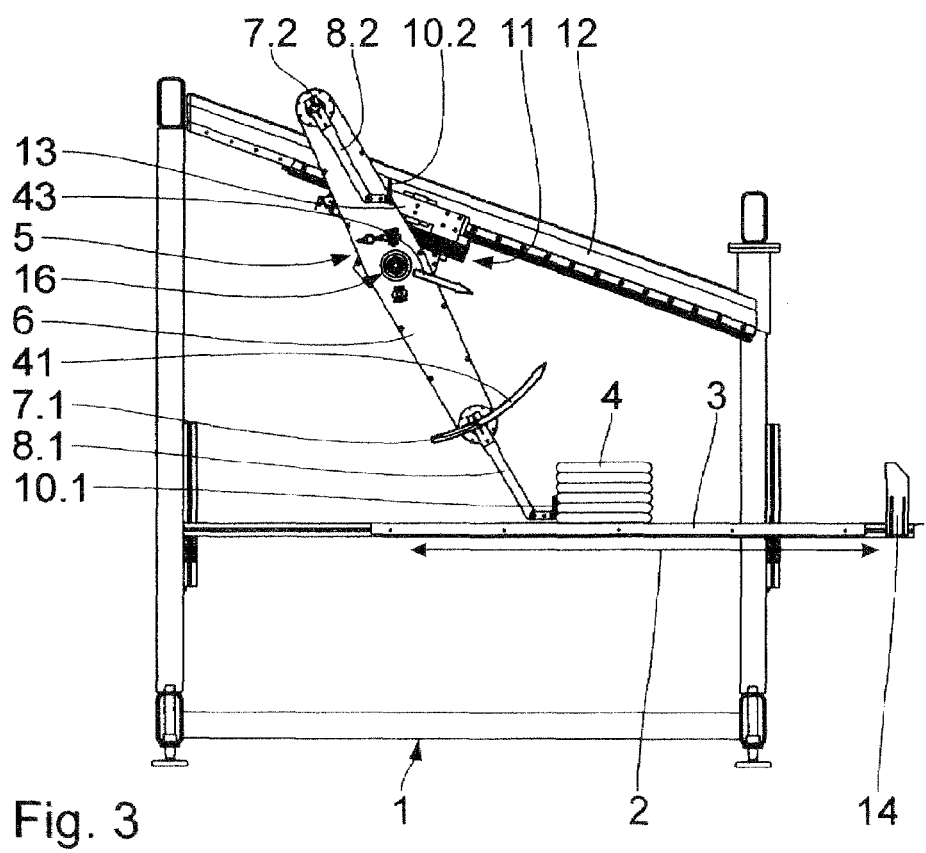

FIG. 2 shows the top dead centre of the reciprocating linear arbor 14, after which point the transport stroke starts (FIG. 3). For this, with continuing rotational movement 41 of the forward-feed lever 6, the linear carriage 13 is guided obliquely downwards along the linear guide 12 (linear movement 43), by which means owing to the approach of the linear carriage 13 to the transport path 12 the lifting movement of the pusher 10.1 is compensated owing to the ascending forward-feed lever 6. In total, the pusher 10.1 executes a linear forward-feed movement along the transport path 2. Owing to the pivoting drive of the guide rods 8.1, 8.2 described with reference to FIG. 6, the guide rods remain in a constant orientation 44, as is indicated by a broken line in FIGS. 1 to 5.

Figure 4:
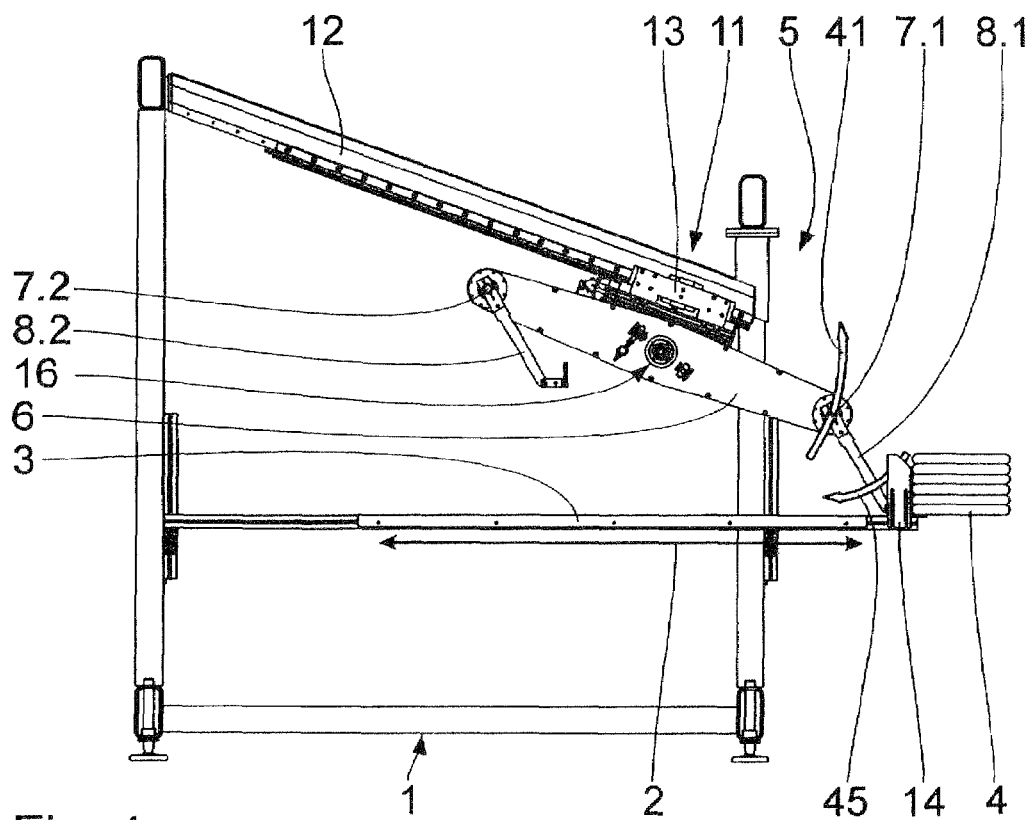
Figure 5:
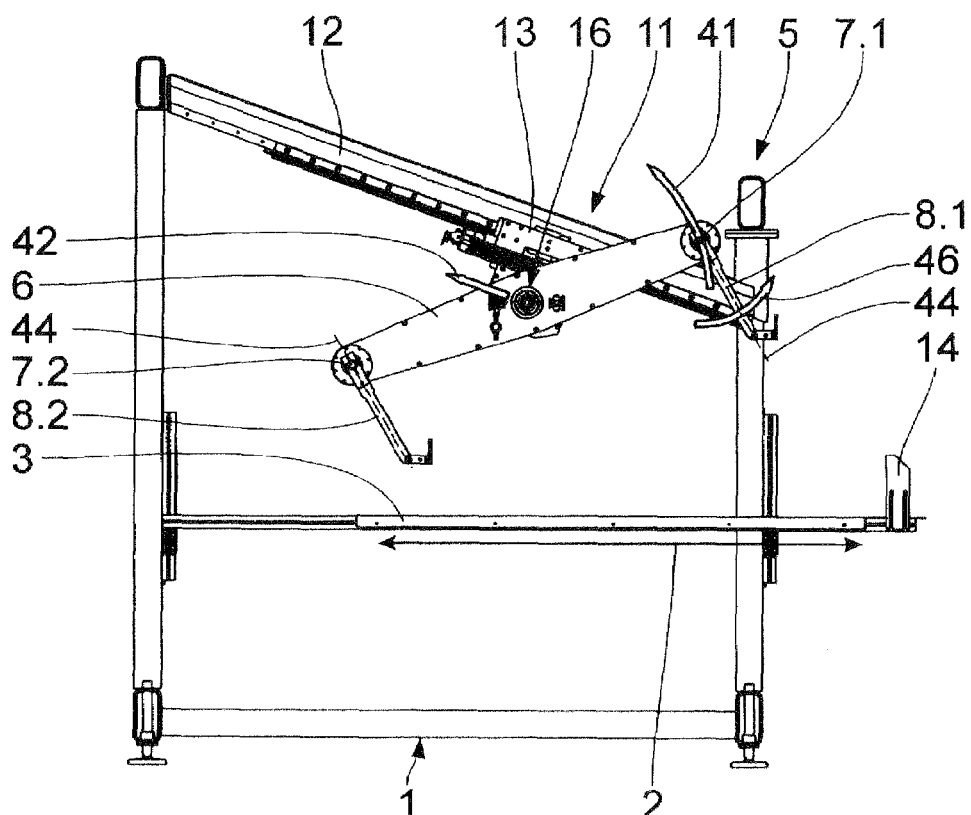

In FIG. 4, the pusher 10.1 has reached a delivery position at the end of the transport path 2. While the forward-feed lever 6 still revolves constantly, at this moment the central pinion 20, for example by the cam control by means of the cam disc 28 and of the control cam 29.1, is briefly set into a swivelling movement counter to the rotational movement 41, by which means the guide rod 8.1 pivots back (arrow 45 in FIG. 4) via the synchronous belt 21 of the guide rod 8.1 (as also the guide rod 8.2). The pusher 10.1 then lifts off backwards from the stack of goods 4 and can be guided upwards away from the transport path through the continuing rotational movement 41 of the forward-feed lever 6 behind and past the stack of goods 4. The central pinion 20 after the running of the control cam 29.1 again pivots back to the original stationary position, so that the guide rod 8.1 is again pivoted forward into its original orientation 44 (arrow 46 in FIG. 5). The return stroke of the pusher 10.1 is finally made through activation of the linear arbor 11 in the reciprocating linear movement 42 with the continuous rotational movement 41 of the forward-feed lever 6. During this return stroke the other pusher 10.2 has reached the starting position in FIG. 1, so that the next stack of goods can be pushed forward along the transport path 2 by means of the other pusher 10.2 by means of a pass, which is phase-shifted by 180°, of the aforementioned cycle. Meanwhile, the pusher 10.1 again runs into the transfer position shown in FIG. 1 and can transport the next-but-one stack of goods.

Overall, during a 360° rotation of the forward-feed lever 6 two stacks of goods can be pushed along the transport path 2 in a clocked manner by means of the two pushers 10.1, 10.2. The linear arbor 11 executes a double reciprocating pass of its linear guide 12.

What is claimed is:

1. A reciprocating forward-feed device for a clocked linear forward-feed of stacks of goods over a transport path (2), comprising a double-arm forward-feed lever (6) rotatable in a rotational plane (R) parallel to the transport path (2) and on two ends of which pushers (10) are mounted and pivotally driven via guide rods (8) in a plane parallel to a rotational plane (R) of the forward-feed lever (6), the pushers (10) being engageable alternately with a stack of goods (4), a four-arbor arrangement for mounting and for a controlled, superimposed rotational, linear and pivoting drive of the forward-feed lever (6) and its guide rods (8) with a rotational arbor (16), driven rotationally at a constant angular velocity, horizontally and transversely to the transport path (2) and arranged outside thereof, a linear arbor (11) driven linearly in a reciprocating manner and coupled to the rotational arbor (16), said linear arbor (11) being inclined in a plane parallel to the rotational plane (R) at an angle (W) to an end of the transport path (2), a pivot arbor (7) for a pivoting drive of the guide rods (8) relative to the forward-feed lever (6), and a return swivel arbor (17) integrated therein for the guide rods (8) of the pushers (10), as well as a control of the movement of the forward-feed lever (6) and its guide rods (8) by means of the four-arbor arrangement, in such a way that starting from a transfer position, one (10.1) of the two pushers (10.1, 10.2), during a transport stroke with superimposition of a rotational movement (41) of the rotational arbor (16), a linear movement (42, 43) of the linear arbor (11) towards the transport path (2) and a pivoting movement of the associated guide rod (8) of the pushers (10), pushes the stack of goods (4) linearly from the transfer position along the transport path (2) into a delivery position of the stack of goods (4) at the end of the transport path (2), where, through activation of the return swivel arbor (17), during further pivoting of the forward-feed lever (6), this pusher (10.1) is lifted by means of a limited, reciprocating return swivelling movement (45) of the guide rod (8) backwards from the stack of goods (4) and is led behind this away from the transport path, and subsequently the pusher (10.1) is returned in a return stroke with superimposition of a further rotational movement (41) of the rotational arbor (16), a return linear movement (42) of the linear arbor (11) away from the transport path (2) and a further pivoting movement of the guide rod (8) on the side of the rotational arbor (16) facing away from the transport path (2) and is swivelled from behind onto the transport path (2) back into the transfer position for the next-but-one respective stack of goods, and the other pusher (10.2) executes the aforementioned cycle with a phase shift of 180° from the one pusher (10.1) while the next respective stack of goods is being transported.

2. Forward-feed device according to claim 1, wherein the linear arbor (11) is formed by a linear guide (12) arranged stationarily relative to the transport path (2) with a linear carriage (13) mounted displaceably thereon.

3. Forward-feed device according to claim 2, wherein the rotational arbor (16) is formed by a rotational drive (15) seated on the linear carriage (13).

4. Forward-feed device according to claim 1, wherein the linear arbor (11) is formed by a linear motor.

5. Forward-feed device according to claim 1, wherein the rotational arbor (16) is arranged displaceably on the linear arbor (11).

6. Forward-feed device according to claim 1, wherein a pivoting drive of the pivot arbors (7) of the guide rods (8) is derived from the rotational arbor (16).

7. Forward-feed device according to claim 6, wherein the pivot arbors (7) of the guide rods (8) are coupled via a revolving chain or synchronous belt drive (21) to a coaxial central pinion (20) which is stationary relative to the rotational arbor (16) during the transport and return stroke.

8. Forward-feed device according to claim 7, wherein the central pinion (20) is mounted in a swivelling manner and can be driven in a reciprocating manner for generating the return swivelling movement of the guide rods (8).

9. Forward-feed device according to claim 8, wherein the central pinion (20) can be activated in a reciprocating manner by the rotating forward-feed lever (6) or by the linear arbor (11) via a cam control (28, 29, 30, 31).

10. Forward-feed device according to claim 8, wherein the central pinion (20) can be activated in a reciprocating manner by a separate servomotor (39).

11. Forward-feed device according to claim 8, wherein the central pinion (20) can be activated by a pneumatic drive.

* * * * *